(12) United States Patent
Milligan et al.

(10) Patent No.: US 6,576,732 B1
(45) Date of Patent: Jun. 10, 2003

(54) DRAG-REDUCING POLYMERS AND DRAG-REDUCING POLYMER SUSPENSIONS AND SOLUTIONS

(75) Inventors: Stuart N. Milligan, Ponca, OK (US); Kenneth W. Smith, Tonkawa, OK (US)

(73) Assignee: ConocoPhillips Co.

( * ) Notice: Subject to any disclaimer, the term of this patent is extended or adjusted under 35 U.S.C. 154(b) by 216 days.

(21) Appl. No.: 09/724,049

(22) Filed: Nov. 28, 2000

(51) Int. Cl.⁷ ............... C08F 212/02; C08F 2/02; C08L 25/02

(52) U.S. Cl. ............ 526/347; 526/142; 526/185; 526/902; 524/474; 524/484; 524/486; 524/578; 523/175; 523/309

(58) Field of Search ............... 526/142, 185, 526/347, 902; 523/175, 309; 524/484, 486, 578, 474; 528/497, 498, 502 R; 137/13

(56) References Cited

U.S. PATENT DOCUMENTS

| | | | |
|---|---|---|---|
| 2,879,173 A | 3/1959 | Tacoe | 117/16 |
| 2,895,939 A | 7/1959 | Stober et al. | 260/45.5 |
| 3,190,565 A | 6/1965 | Jayne | 241/22 |
| 3,215,154 A | 11/1965 | White et al. | 137/13 |
| 3,351,601 A | 11/1967 | Blaga et al. | 260/28.5 |
| 3,528,841 A | 9/1970 | Donaldson et al. | 117/16 |
| 3,632,369 A | 1/1972 | Granville | 117/16 |
| 3,687,699 A | 8/1972 | Prosser et al. | 117/4 |
| 3,692,675 A | 9/1972 | Nimerick | |
| 3,692,676 A | 9/1972 | Culter et al. | 252/8.55 |
| 3,730,275 A | 5/1973 | McClafin et al. | 166/308 |
| 3,736,288 A | 5/1973 | Stratta et al. | 260/33.4 R |
| 3,739,991 A | 6/1973 | Wehren et al. | 241/45 |
| 3,771,729 A | 11/1973 | Grable | 241/65 |
| 3,791,913 A | 2/1974 | Ver Strate et al. | 161/164 |
| RE28,361 E | 3/1975 | Hahn | 117/16 |
| 3,884,252 A | 5/1975 | Kruka et al. | 137/13 |
| 3,928,263 A | 12/1975 | Grant | 260/17 |
| 4,025,990 A | 5/1977 | Lovette, Jr. | 241/14 |
| 4,066,539 A | 1/1978 | Hachisu et al. | 210/36 |
| 4,147,677 A | 4/1979 | Lundberg et al. | 260/23.5 A |
| 4,151,135 A | 4/1979 | McClain | 260/23 R |
| 4,157,790 A | 6/1979 | Benn et al. | 241/22 |
| 4,166,043 A | 8/1979 | Uhlmann et al. | 252/300 |
| 4,171,056 A | 10/1979 | Hannon et al. | 215/12 |
| 4,233,365 A | 11/1980 | Karg | 428/404 |
| 4,239,052 A | 12/1980 | McClaflin | 137/13 |
| 4,260,066 A | 4/1981 | Hannon et al. | 215/12 |
| 4,287,902 A | 9/1981 | McClaflin et al. | 137/13 |
| 4,289,679 A | 9/1981 | Mack | 260/33.6 PQ |
| 4,325,861 A | 4/1982 | Braun et al. | 523/205 |
| 4,333,488 A | 6/1982 | McClaflin | 137/13 |
| 4,340,076 A | 7/1982 | Weitzen | 137/13 |
| 4,341,078 A | 7/1982 | Weitzen | 62/48 |
| 4,345,013 A | 8/1982 | Diamond et al. | 430/106.6 |
| 4,355,651 A | 10/1982 | McClaflin | 137/13 |
| 4,358,572 A | 11/1982 | Mack et al. | 526/142 |
| 4,371,455 A | 2/1983 | Mack et al. | 252/429 C |
| 4,382,108 A | 5/1983 | Carroll et al. | 428/326 |
| 4,415,714 A | 11/1983 | Mack | 526/125 |
| 4,420,400 A | 12/1983 | Weitzen | 210/710 |
| 4,428,535 A | 1/1984 | Venetucci | 241/35 |
| 4,433,123 A | 2/1984 | Mack | 526/139 |
| 4,440,916 A | 4/1984 | Waters et al. | 525/54.2 |
| 4,493,903 A | 1/1985 | Mack | 502/121 |
| 4,493,904 A | 1/1985 | Mack | 502/122 |
| 4,578,313 A | 3/1986 | Ito et al. | 428/403 |
| 4,584,244 A | 4/1986 | Fenton | 428/407 |
| 4,585,810 A | 4/1986 | Bock et al. | 523/175 |
| 4,650,126 A | 3/1987 | Feder et al. | 241/22 |
| 4,693,321 A | 9/1987 | Royer | 137/13 |
| 4,720,397 A | 1/1988 | O'Mara et al. | 427/180 |
| 4,756,326 A | 7/1988 | Johnston | 137/13 |
| 4,771,799 A | 9/1988 | Baxter et al. | 137/13 |
| 4,771,800 A | 9/1988 | Pomeroy | 137/13 |
| 4,789,383 A | 12/1988 | O'Mara et al. | 44/55 |
| 4,826,728 A | 5/1989 | O'Mara et al. | 428/407 |
| 4,837,249 A | 6/1989 | O'Mara et al. | 523/175 |
| 4,845,178 A | 7/1989 | Hostetler et al. | 526/153 |
| 4,881,566 A | 11/1989 | Ubels et al. | 137/13 |
| 4,945,142 A | 7/1990 | Gessell et al. | 526/128 |
| 4,952,738 A | 8/1990 | Gessell et al. | 585/3 |
| 5,027,843 A | 7/1991 | Grabois et al. | 137/13 |
| 5,165,441 A | 11/1992 | Mitchell | 137/13 |
| 5,244,937 A | 9/1993 | Lee et al. | 523/204 |
| 5,276,116 A | 1/1994 | Gessell et al. | 526/128 |
| 5,376,697 A | 12/1994 | Johnston et al. | 523/175 |
| 5,430,118 A | 7/1995 | Powers et al. | 526/347 |
| 5,449,732 A | 9/1995 | Smith et al. | 526/348.3 |
| 5,504,131 A | 4/1996 | Smith et al. | 524/401 |
| 5,504,132 A | 4/1996 | Smith et al. | 524/401 |
| 5,539,044 A | 7/1996 | Dindi et al. | 524/570 |
| 5,654,361 A | 8/1997 | Gunesin et al. | 524/577 |
| 5,906,665 A | 5/1999 | Trippe et al. | 44/459 |
| 5,942,461 A | 8/1999 | Brown et al. | 502/154 |
| 6,172,151 B1 | 1/2001 | Johnston et al. | 524/379 |

FOREIGN PATENT DOCUMENTS

| | | | |
|---|---|---|---|
| CA | 675522 | 12/1963 | 241/135 |
| EP | 0017368 | 3/1980 | 19/18 |
| GB | 1452146 | 12/1973 | C08J/3/08 |

OTHER PUBLICATIONS

Ricci, Larry J., "Cryogenic grinding: no quick thaw in CPI use," Chemical Engineering Jul. 4, 1973.

Oberpriller, Ing. Jakob; "Disintegration under Refrigeration of Substances with Poor Grinding Properties," Linde Reports on Science and Technology, 24/1976.

Frable, Norman B., Savage, Raymond W.; "Recycled scrap becomes valuable resource," Rubber World.

(List continued on next page.)

Primary Examiner—Fred Teskin
(74) Attorney, Agent, or Firm—ConocoPhillips Co.

(57) ABSTRACT

A drag-reducing polymer is described, along with a method for manufacturing the drag-reducing polymer. The drag-reducing polymer is manufactured by bulk polymerizing a vinyl aromatic with an α-olefin, wherein the α-olefin has a carbon chain length of between two and twenty carbons. A drag-reducing polymer suspension and drag-reducing polymer solution are also described.

30 Claims, 1 Drawing Sheet

OTHER PUBLICATIONS

"Cryogenic Size–Reduction Technology Provides Economical Recycling Method," Elastomerics, Dec. 1977.

Weishaupt, Dr.–Ing. J. et al.; "Size–Reduction of Thermoplastic Materials at Low Temperature and the Economic Aspects," Linde Reports on Science and Technology,, 15/1970.

Bajaj, J.K.L., "Grinding the Tough Plastics At Cryogenic Temperature," Plastics Design & Processing, Feb. 1977.

Biddulph, Michael W., "Coolers for cryogenic grinding," Chemical Engineering, Feb. 11, 1980.

$N_2$itro Grind Cryogenic Grinding Systems brochure, 1977 Liquid Carbonic Corporation Form No. 6625.

Simmonds, D.K., Air Products Limited (publication and date unknown).

Frable, Norman B., "Keep Scrap Quality High with Cryogenic Grinding," Plastics Engineering, May 1976.

"Cryogenic Grinding System," Plastics & Rubber Weekly, Oct. 22, 1976.

"Cryogenic Grinding Gets a Lift from New Stress on Cost Reduction," Modern Plastics, Dec. 1977.

Disclosed Anonymously, Research Disclosure, Feb. 1984 "Agglomeration–free storage of polymeric dragreducers," Feb. 1984.

"Cryogenic Recycling Technology gets more Practical– Even for the Toughest Combinations of Materials," Modern Plastics, Jul. 1981.

Frable, Norman B., "Cryogenic Size Reduction of Plastics," Modern Plastics, May 1979.

Murtland, W.O., "Cyrogrinding Scrap into Filler," Elastomerics, Mar. 1978.

Lester, C.B., "Drag–Reducing Agents–Conclusion," Oil & Gas Journal, Mar. 11, 1985.

DRAG-REDUCING POLYMERS AND DRAG-REDUCING POLYMER SUSPENSIONS AND SOLUTIONS

FIELD OF THE INVENTION

The present invention relates to drag-reducing polymers and their method of manufacture. More specifically, this invention relates to a method for preparing ultra-high molecular weight, substantially non-crystalline hydrocarbon-soluble polymers through bulk polymerization.

BACKGROUND OF THE INVENTION

A drag-reducing agent is one that substantially reduces the friction loss that results from the turbulent flow of a fluid. Where fluids are transported over long distances, such as in oil and other hydrocarbon liquid pipelines, these friction losses result in inefficiencies that increase equipment and operations costs. Ultra-high molecular weight polymers are known to function well as drag-reducing agents, particularly in hydrocarbon liquids. In general, drag reduction depends in part upon the molecular weight of the polymer additive and its ability to dissolve in the hydrocarbon under turbulent flow. Effective drag-reducing polymers typically have molecular weights in excess of five million.

Drag-reducing polymers are known in the art. Representative, but non-exhaustive, samples of such art are: U.S. Pat. No. 3,692,675, which teaches a method for reducing friction loss or drag for pumpable fluids through pipelines by adding a minor amount of a high molecular weight, non-crystalline polymer; and U.S. Pat. No. 3,884,252, which teaches the use of polymer crumb as a drag-reducing material. These materials are extremely viscoelastic, and, in general, have no known use other than as drag-reducing materials. However, the very properties that make these materials effective as drag-reducing additives make them difficult to handle because they have a severe tendency to cold flow and reagglomerate even at subambient temperatures. Under conditions of pressure, such as stacking or palleting, cold flow is even more intense and reagglomeration occurs very quickly.

The general propensity of non-crosslinked elastomeric polymers (elastomers) to cold flow and agglomerate is well-known. Polymers of this sort cannot be pelletized or put into discrete form and then stored for any reasonable period of time without the materials flowing together to form large agglomerates. Because of such difficulties, elastomers are normally shipped and used as bales of rubber. However, such bales must be handled on expensive equipment and cannot be pre-blended. In addition, polymers such as the drag-reducing additives described are not susceptible to such balings, since cold flow is extremely severe. Further, dissolution time for such drag-reducing materials from the bulk polymer state in the flowing hydrocarbons to a dissolved state is so lengthy as to severely reduce the effectiveness of this material as a drag-reducing substance.

Numerous attempts have been made to overcome the disadvantages inherent in cold-flowing polymers. Representative, but non-exhaustive, of such art is that described in U.S. Pat. No. 3,791,913, wherein elastomeric pellets are surface cured, i.e., vulcanized to a minor depth in order to maintain the unvulcanized interior of the polymer in a "sack" of cured material, and U.S. Pat. No. 4,147,677, describing a method of preparing a free-flowing, finely divided powder of neutralized sulfonated elastomer by admixing with fillers and oils. This reference does not teach a method for making free-flowing powders of non-elastomeric material. U.S. Pat. No. 3,736,288 teaches solutions of drag-reducing polymers in inert, normally liquid vehicles for addition to liquids flowing in conduits. A "staggered dissolution" effect is provided by varying the size of the polymer particles. Suspension or surface-active agents can also be used. While directed to ethylene oxide polymers, the method is useful for hydrocarbon-soluble polymers as well. U.S. Pat. No. 4,088,622 describes a method of making an improved, molded drag-reducing coating by incorporating antioxidants, lubricants, and plasticizers and wetting agents in the form of a coating which is bonded directly onto the surface of materials passing through a liquid medium. U.S. Pat. No. 4,340,076 teaches a process for dissolving ultra-high molecular weight hydrocarbon polymer and liquid hydrocarbons by chilling to cryogenic temperatures comminuting the polymer formed into discrete particles and contacting these materials at near cryogenic temperatures with the liquid hydrocarbons to more rapidly dissolve the polymer. U.S. Pat. No. 4,341,078 immobilizes toxic liquids within a container by injecting a slurry of cryogenically ground polymer particles while still at cryogenic temperatures into the toxic liquid. U.S. Pat. No. 4,420,440 teaches a method for collecting spilled hydrocarbons by dissolving sufficient polymer to form a nonflowing material of semi-solid consistency by contacting said hydrocarbons with a slurry of cryogenically comminuted ground polymer particles while still at cryogenic temperatures.

Some current drag-reduction systems inject a drag-reducing polymer solution containing a high percentage of dissolved, ultra-high molecular weight polymer into conduits containing the hydrocarbon. The drag-reducing polymer solution is normally extremely thick and difficult to handle at low temperatures. Depending upon the temperature of the hydrocarbon and the concentration at which the drag-reducing polymer solution is injected, significant time elapses before dissolution and resulting drag reduction. Solid polymers of these types can take days to dissolve in some cases, even though drag reduction is greatly enhanced once dissolution has finally occurred. Dissolution at low temperatures, i.e., below 70 F, may be so slow with some polymers that there is little practical drag-reduction benefit with those polymers. Further, certain polymers may not be suitable for certain hydrocarbons. For instance, copolymers of $\alpha$-olefins will not dissolve in heavy, aromatic crude oils and so are unsuitable in these applications as drag-reducing agents.

Another way to introduce ultra-high molecular weight polymers into the flowing hydrocarbon stream is through a suspension. Powdered ultra-high molecular weight polymers are suspended in a liquid that will not dissolve or will only partially dissolve the ultra-high molecular weight polymer. This suspension is then introduced into the flowing hydrocarbon stream. The tendency of the ultra-high molecular weight polymers to reagglomerate makes manufacture of these suspensions difficult. A way of controlling the tendency of the ultra-high molecular weight polymers to reagglomerate is to partially surround the polymer particles with a partitioning agent, occasionally termed a coating material, to reduce the ability of these polymers to reagglomerate. U.S. Pat. No. 4,584,244, which is hereby incorporated by reference, describes a process whereby the polymer is ground and then coated with alumina to form a free-flowing powder. Some processes using a partitioning agent require that the partitioning agent completely surround the polymer core, which requires that at least 20% and often as much as 50% of the weight of the final composition be the partitioning agent. Other examples of partitioning agents used in the art include talc, tri-calcium phosphate, calcined clays, magnesium stearate, silica, polyanhydride polymers, sterically hindered alkyl phenol antioxidants, and graphite. Partitioning agents, however, add weight to the drag-reducing agent material, resulting in higher transport costs and additional handling equipment, without any drag-reducing benefit. Further, some partitioning agents are incompatible with the hydrocarbon fluid or may be an unwanted contaminant in the hydrocarbon fluid.

The most common polymerization method for manufacturing these polymers is solution polymerization. With solution polymerization, however, yields are often lower than desired and the solution medium must be removed, often using an expensive and time-consuming drying process, before the polymer may be used. In addition, when using solution polymerization processes to produce drag-reducing polymers it is necessary to terminate reactions at no more than 20% polymer based on total reactor content by weight in order to obtain the high molecular weight polymers in an effective form, as taught in U.S. Pat. Nos. 4,415,714, 4,493,903, and 4,945,142.

One alternative to solution polymerization is bulk polymerization. Bulk-polymerized drag-reducing polymers should have five characteristics: 1) less than 5% unpolymerized material should remain in the bulk polymerized material; 2) it must be possible to grind them to a fine, stable powder; 3) they must form stable suspensions; 4) they must dissolve rapidly in various hydrocarbons at temperatures as low as 30° F.; and 5) they must effectively reduce the frictional drag in hydrocarbon pipelines.

SUMMARY OF THE INVENTION

Accordingly, a drag-reducing polymer, and drag-reducing polymer suspension and method of manufacturing the drag-reducing polymer suspension are disclosed herein that meet all five of these criteria. One embodiment of the present invention is drawn to an ultra-high molecular weight copolymer composed of a vinyl aromatic monomer and an α-olefin monomer where the α-olefin monomer has a carbon chain length of between 2 and 20 carbon atoms. In another embodiment, a method of manufacturing an ultra-high molecular weight copolymer is disclosed where a mixture of an α-olefin having a carbon chain length of between 2 and 20 carbon atoms and a vinyl aromatic is bulk polymerized to form the ultra-high molecular weight copolymer. The ultra-high molecular weight copolymer has a molecular weight of greater than 1 million. In still another embodiment, method of manufacturing an ultra-high molecular weight copolymer is disclosed where the ultra-high molecular weight copolymer is manufactured by forming a monomer mixture composed of an α-olefin monomer having a carbon chain length of between 2 and 20 carbon atoms and a vinyl aromatic monomer. An initiator, catalyst and promoter are then added and the mixture allowed to react to form the ultra-high molecular weight copolymer. The ultra-high molecular weight copolymer has a molecular weight of greater than 1 million. In another embodiment of the present invention, a method for the preparation of a drag-reducing copolymer suspension is disclosed where an ultra-high molecular weight copolymer is prepared by co-polymerization of an α-olefin with a vinyl aromatic, wherein the α-olefin has a carbon chain length of between 2 and 20 carbon atoms. The ultra-high molecular weight copolymer is then ground at a temperature below the glass-transition temperature of the ultra-high molecular weight copolymer to form ground polymer particles. The ground polymer particles are then mixed with a suspending fluid to form the drag-reducing polymer suspension. In still another embodiment, a drag-reducing polymer solution is disclosed, which is composed of an ultra-high molecular weight copolymer having a vinylaromatic monomer and an α-olefin monomer having a carbon chain lengths of between 2 and 20 carbon atoms, and a heavy hydrocarbon.

One advantage of the present invention is that the drag-reducing polymer suspension is easily transportable and does not require pressurized or special equipment for storage, transport, or injection. Another advantage is that the drag-reducing polymer is quickly dissolved in various flowing hydrocarbon streams. Yet another advantage is that the copolymers of the present invention are soluble in heavy aromatic hydrocarbons at temperatures as low as 0° C. (32° F.). Another advantage of copolymers of the present invention is that they may either be transported in a stable suspension, or pre-dissolved in a small amount of heavy hydrocarbon. Still another advantage of the present invention is that reagglomeration of the drag-reducing polymers is greatly reduced, allowing for easier handling during manufacture. Another advantage of the present invention is that the drag-reducing polymer suspension is stable, allowing a longer shelf life and balancing of customer demand with manufacturing time. Another advantage is that costly solvent removal is minimized. A further advantage of the present invention is that the amount of inert ingredients in the final product is reduced.

DETAILED DESCRIPTION OF THE INVENTION

Figure 1:
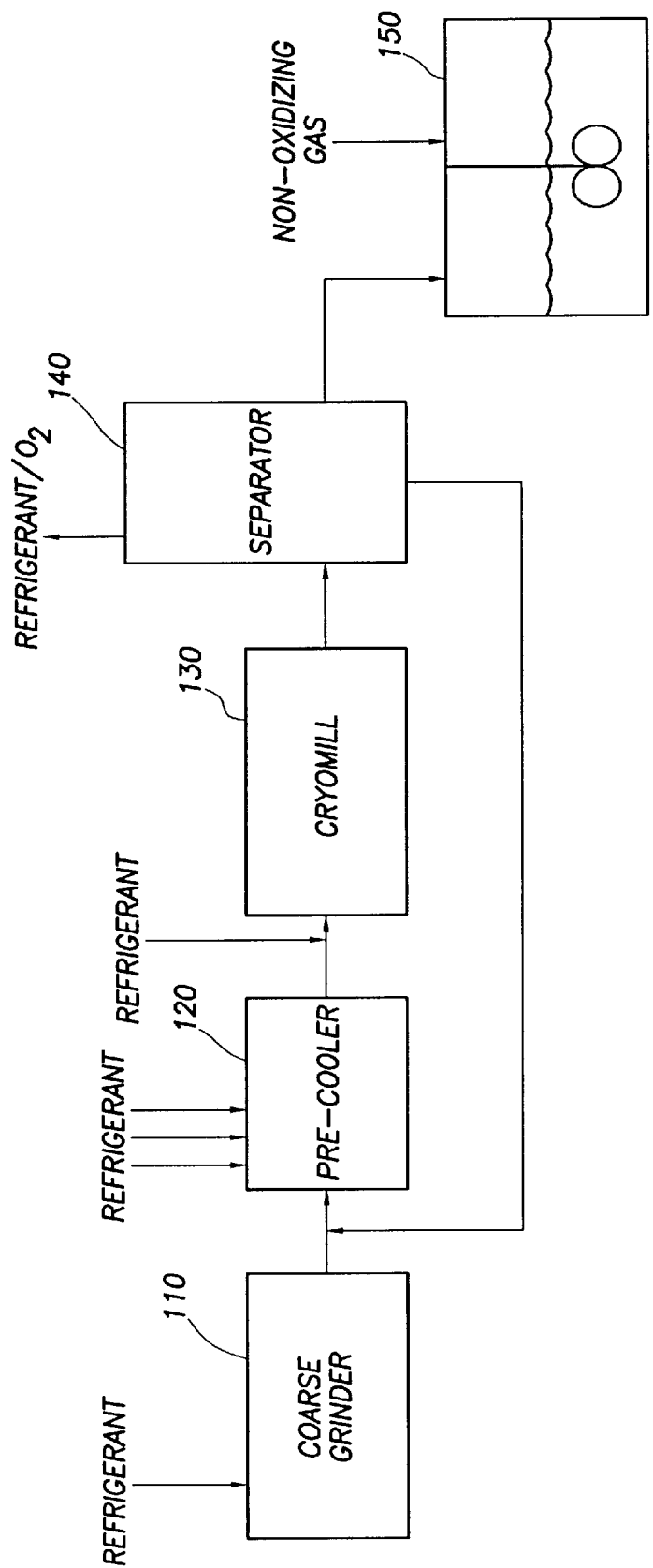
FIG. 1 is a schematic of the apparatus for manufacturing the drag-reducing polymer suspension.

In the present invention, drag-reducing polymers are produced via bulk polymerization to produce a substantially non-crystalline, hydrocarbon-soluble, ultra-high molecular weight drag-reducing polymer. The polymer is produced by the bulk co-polymerization of α-olefins containing from 2 to 20 carbon atoms with vinylaromatic monomers in the presence of a polymerization catalyst under polymerization conditions while removing sufficient heat of reaction to obtain a polymer having an inherent viscosity (IV) of at least 25 deciliters per gram (dL/g). Because of the ultra-high molecular weights obtained, the procedure for determining IV was modified, using a four bulb shear dilution viscometer, and measuring at 0.05 gram (g) of polymer/100 milliliters (ml) of hexane solvent at 25° C. and a shear rate of 300 sec−1 where the results of the high shear bulb are not used.

It is distinctly surprising that bulk polymerization is capable of producing such high molecular weight non-crystallizing polymers. The drag-reducing art has hitherto taught that it is necessary to keep monomer concentrations low (below 20% by weight total polymer) in solution polymers in order to achieve molecular weights capable of imparting good drag reduction (U.S. Pat. Nos. 4,358,572, 4,415,714, 4,433,123, 4,493,903), and preferably carrying out polymerizations at as low a temperature as possible consistent with commercial production. U.S. Pat. No. 4,384,089 requires a significant portion of the reaction be carried out at low temperatures and the monomer chilled.

Throughout this specification and claims, the term "bulk polymerization" means that the polymerization medium contains primarily catalyst, α-olefins monomers, and vinylaromatic monomers. Although some diluent hydrocarbons can be present, nearly all reactive monomers are normally reacted. The reaction medium will normally contain at least 80% reactive monomers by weight, and normally these monomers are nearly completely reacted, resulting in polymer contents of normally at least 80% by weight of the total reaction medium, based on the total reactor content. Preferably the monomers comprise at least 90% by weight of the total reaction medium, resulting in final polymer contents of normally at least 90% by weight of the total reaction medium, and most preferably the monomers comprise at least 95% by weight of the total reaction medium, resulting in final polymer contents of normally at least 95% by weight of the total reaction medium.

The bulk polymerizations of the present invention may be carried out using any α-olefin polymerization catalyst, but Ziegler-Natta catalysts are preferred. The Ziegler-Natta catalysts used can be any of those described in the art. Particularly useful materials are those described in U.S. Pat. Nos. 4,945,142, 4,358,572, 4,371,455, 4,415,714, 4,333,123, 4,493,903 and 4,493,904, which are hereby incorporated by reference. Applicable metallocene catalysts may also be used. In bulk polymerization systems, catalysts are used typically at a concentration of 3500 moles monomer per mole transition metal halide in the catalyst, although ratios can vary from as low of 500/1 to as high as 10000/1 or more. Catalyst concentration affects rate of reaction and temperature as well as molecular weight. These catalysts often are more effective when used in the presence of a promoter, such as dibutyl ether, or an initiator, such as disobutyl aluminum chloride (DIBAC).

Consistent conversions of more than 95 percent polymer by weight can be obtained by using these catalysts in bulk polymerizations. Polymers prepared according to the present invention are extremely effective relative to solution-polymnerized materials now in commercial use which contain solvent. In addition, the reduction in solvent used to manufacture bulk-polymerized materials results in reduction or elimination of the solvent removal step.

The polymers of the present invention are produced by co-polymerizing one or more vinyl aromatic monomers in combination with one or more α-olefin monomers. The α-olefin monomer component(s) should have a carbon chain length of between two and twenty carbon atoms. Mixtures of two or more different α-olefin monomers may be used as long as all α-olefin monomers have carbon chain lengths of between 2 and 20 carbon atoms. Non-exclusive examples of these α-olefin monomers include 1-hexene, 1-heptene, 1-octene, 1-nonene, 1-decene, 1-undecene, 1-dodecene, and mixtures thereof.

The second monomer of the present invention is a vinyl aromatic. These vinyl aromatics include styrene, alkylstyrenes with an alkyl group having between 1 and 10 carbon atoms, such as methylstyrenes, such as 4-methylstyrene, 3-methylstyrene, alpha-methylstyrene, and beta-methylstyrene, and t-butylstyrene, vinyl toluenes, and naphthalene and its derivatives, such as 1-vinylnaphthalene and 2-vinylalkylnaphthalene, as well as mixtures of two or more of the listed vinyl aromatics. The amount of vinyl aromatic in the bulk polymerization mixture should be between 1% and 50% by weight of the total reaction medium, preferably between 2% and 25%. The vinyl aromatic is fully incorporated into the copolymer, i.e., the vinyl aromatic percentage in the copolymer is approximately equal to that of the original mixture. These polymers are copolymers as they are composed of more than one type of monomer. The α-olefin and vinylaromatic monomers are collectively referred to as co-monomers. Unlike polymers formed from only α-olefin monomers, the α-olefin-vinyl aromatic copolymers are generally more soluble than polymers formed from only α-olefin monomers in heavy aromatic crude oils particularly at temperatures below 20° C. (68° F.) and as low as 0° C. (32° F.). Further, these copolymers have excellent solubility in many hydrocarbons other than heavy aromatic crude oils. Some vinyl aromatics, particularly styrene also may be less costly than other monomers often used to make drag-reducing polymers. Vinyl aromatics also tend to decrease the crystallinity of the polymer, increasing its effectiveness a s a drag reducer.

For polymerization reactions which are incomplete, removal of unreacted monomers is advantageous, and can be carried out by vacuum drying and/or vacuum drying with precipitation according to well known techniques. However, it is preferred that a bulk reaction simply be carried out to substantial completion preferably to 99% completion or more and that the drying step to remove monomer and/or solvent be avoided whenever possible.

Polymerization reactions of this invention are exothermic reactions. It is preferred and sometimes even necessary to control the heat transfer and/or temperature rise in bulk polymerizations in order to obtain ultra-high molecular weights (inherent viscosity) required for best drag reduction. To be an effective drag-reducing agent within the scope of this invention, the polymer should have a molecular weight in excess of 1 million and preferably in excess of 5 million. In order to keep the temperatures of the reaction mixture sufficiently low throughout the reaction period to make such ultra-high molecular weight polymer more or less uniform in the reaction container, it is preferred to design reaction enclosures as small as possible in the various dimensions. Preferably, reaction vessels should be shaped such that maximum surface area is exposed to a cooling medium in order to facilitate heat transfer and to achieve ultra-high molecular weight.

Polymeric bottles and bags may be used as effective polymerization reaction enclosures. The produced polymer is generally adherent to the walls of such reaction enclosures, and, therefore, it is more convenient that the polymeric reaction enclosures may be ground with the final product in forming the drag-reducing materials of the present invention. It is, of course, possible to carry out bulk polymerization in conventional reactors, belt polymerization systems, clam-shell reactors or reactions in single-layer polymer reactors (bottles or bags). While all reactor styles can be used, the presently described embodiments are preferred, catalysts are sensitive to oxygen and water, the reaction enclosures must be made of barrier polymers which are capable of excluding air and water from the reaction mixture during the reaction. These barrier polymers are crystalline and are non-soluble in the hydrocarbons in which the drag-reducing non-crystalline polymers are soluble at ambient conditions, such as crude oil and refined fuels. These barrier polymers may be cross-linked.

The reaction enclosures may contain five to seven layers, including a water impervious polyolefin such as polypropylene, polyethylene, polybutylene, a bonding polymer, and ethylene vinyl alcohol copolymer oxygen barrier, another bonding polymer, and externally coated with polyethylene, polypropylene or polybutylene. Use of polyethylene terephthlate as an additional layer to add reactor strength at high temperatures is most preferred. Ethylenevinyl alcohol copolymer is an excellent oxygen barrier but a poor water barrier, while polyethylene, polypropylene, polybutylene and the like are excellent water barriers but do permit the passage of oxygen. As these barrier materials do not have good mutual adhesion, a polymer designed to adhere to both is sandwiched between these materials. An example of the bonding polymer are the coextrudable adhesive polymers sold under the registered trademark "BYNEL" by the duPont Company.

The ethylenevinyl alcohol copolymer also has better oxygen barrier properties when dry, and placing the ethylenevinyl alcohol copolymer layer interior to the water resistant exterior polyolefin materials enhances its oxygen barrier effectiveness. A function of the polyolefin layer adjacent the reaction mixture is to protect the catalyst from reacting with the functional groups on the ethylenevinyl alcohol copolymer.

Although these reactor materials have been used successfully, it should be apparent to one skilled in the art that substitutions can be made. For example, some nylons and polyesters have adequate oxygen barrier properties. Most thermo-plastic, crystalline polyolefins could replace those mentioned for forming the bottles and bags. However, for cost effectiveness and readily available materials, the ones specifically mentioned are preferred though there is no technical reason not to substitute other materials capable of similar performance. The presence of the finely ground disposable reactors surprisingly does not have an adverse effect on drag reduction or on the hydrocarbon in which the drag reducer is dissolved. Since the drag-reducing polymer is normally present at levels no higher than 50 parts per million (ppm) in the hydrocarbon, the disposable reactor particles are present at levels of less than 1 ppm.

In a typical experiment, the catalyst and monomers are combined in a reaction vessel and agitated at ambient conditions for a period of time sufficient to increase viscosity of the reaction mixture sufficiently to suspend the catalyst and then placed into a cool environment to allow the reaction to proceed. The cool environment is normally maintained at a temperature from about −20° C. to about 25° C. (about −4° F. to about 80° F.), allowing the reaction to proceed at a relatively constant pace, while removing heat and forming high molecular weight polymers. Conversions of more than 95% can be obtained with a 99% preferred. Depending on the monomers and catalyst used and reaction conditions, reaching such conversion levels may require longer reaction times, typically in the range of from about one hour to several days.

The ultra-high molecular weight copolymer of the present invention may be ground at temperatures below the glass transition temperature of the polymer, and then mixed in a carrier fluid. Glass transition temperatures vary with the type of polymer, and typically range between −10° C. to −100° C. (14° F. and −148° F.). This temperature can vary depending upon the glass transition point of the particular copolymer, but normally such temperatures must be below the lowest glass transition point of a polymer which comprises a polymer blend.

As shown in FIG. 1, the ultra-high molecular weight, polymer is conveyed to coarse grinder 110. Coarse grinder 110 chops large chunks of copolymer into small polymer pieces, typically between 1¼ to 1½ centimeters (½" to ⅝") in diameter. While coarse chopper 110 may be operated at ambient temperatures, it is preferable to cool the polymer in coarse chopper 110 to between 5° to 15° C. (41° to 59° F.). The polymer in coarse chopper 110 may be cooled either internally or externally or both, with a liquid, gaseous, or solid refrigerant, or a combination thereof, but most commonly by spraying a liquid refrigerant into coarse-chopped 110, such as liquid nitrogen, liquid helium, liquid argon, or a mixture of two or more such refrigerants. It is more preferred to avoid the use of partitioning agent, as it is inert material in the final drag-reducing suspension that does not impart any drag-reducing benefits.

The small polymer pieces formed in coarse chopper 110 are then transported to pre-cooler 120. This transport may be accomplished by any number of typical solids handling methods, but is most often accomplished through the use of an auger or a pneumatic transport system. Pre-cooler 120 may be an enclosed screw conveyor with nozzles for spraying a liquid refrigerant, such as liquid nitrogen, liquid helium, liquid argon, or mixtures thereof onto the small polymer pieces. While a gaseous refrigerant may also be used alone, the cooling efficiency is often too low. Pre-cooler 120 reduces the temperature of the small polymer pieces to a temperature below the glass transition temperature of the polymer. This temperature is preferably below −130° C. (−202° F.), and most preferably below −150° C. (−238° F.). These temperatures may be produced by any know methods, but use of liquid refrigerant such as that consisting essentially of liquid nitrogen, helium, argon, or a mixture of two or more such refrigerants sprayed directly onto the polymer is preferred as the resulting atmosphere reduces or eliminates hazards that exist when polymer particles are mixed with an oxygen-containing atmosphere. The rate of addition of the liquid refrigerant may be adjusted to maintain the polymer within the preferred temperature range.

After the small polymer pieces are cooled in pre-cooler 120, they are transported to cryomill 130. Again, this transport may be accomplished by any typical solids handling method, but often by an auger or a pneumatic transport system. A liquid refrigerant may be added to cryomill 130 in order to maintain the temperature of the polymer in cryomill 130 below the glass transition temperature of the ultra-high molecular weight, polymer. In one embodiment of the invention, this liquid refrigerant is added to the small polymer pieces at the entrance to cryomill 130. The temperature of the cryomill must be kept at a temperature below the glass transition temperature. It is preferable to maintain the temperature of the cryomill between −130° C. to −155° C. (−202° F. to 247° F.). Cryomill 130 may be any of the types of cryomills known in the art, such as a hammer mill or an attrition mill. In an attrition cryomill, the polymer pieces are ground between a rapidly rotating disk and a stationary disk to form small particles between 10 and 800 microns in diameter. The small particles formed in cryomill 130 are then transferred to separator 140. Most of the liquid refrigerant vaporizes in separator 140. Separator 140 acts to separate the primarily vaporized refrigerant atmosphere from the solid polymer particles, and the larger polymer particles from the small polymer particles. Separator 140 may be any known of separator suitable for separating particles of this size, including a rotating sieve, vibrating sieve, centrifugal sifter and a cyclone separator. Separator 140 vents a portion of the primarily vaporized refrigerant atmosphere from cryomill 130, and separates particles into a first fraction with less than about 400 microns in diameter from a second fraction of those with diameters of about 400 microns and above. The second fraction of those particles of about 400 microns and greater is discarded or preferably returned for recycle purposes to the pre-cooler for re-grinding. The first fraction of those particles of less than about 400 microns is then transported to mix tank 150. The 400 micron size for the particles is nominal and may vary or have a distribution of anywhere from about 300 to about 500 microns, depending on the separator, operating conditions, and desired end use.

The small polymer particles (first fraction) are mixed with a suspending fluid in mix tank 150 to form a suspending fluid/polymer particles mixture. The suspending fluid is any liquid that is a non-solvent for the ultra-high molecular weight polymer. Water is most commonly used. For many other mixtures, lower carbon alcohols such as methanol, ethanol or their mixtures, with or without water, may also be used as the suspending fluid. Mix tank 150 acts to form a suspension of the polymer particles in the suspending fluid. Other components may be added, to the mix tank before, during, or after mixing the ground polymer particles with the suspending fluid in order to aid the formation of the suspension, and/or to maintain the suspension. For instance, glycols, such as ethylene glycol or propylene glycol, may be added for freeze protection or as a density balancing agent. The amount of glycol added may range from 10% to 60% by weight of the suspending fluid, as needed. A suspension stabilizer may be used to aid in maintaining the suspension of the ultra-high molecular weight, non-tacky polymer particles. Typical suspension stabilizers include talc, tri-calcium phosphate, magnesium stearate, silica, polyanhydride polymers, sterically hindered alkyl phenol antioxidants, and graphite. The amount of the suspension stabilizer may be minimized or eliminated where possible to reduce the amount of material in the suspension that does not act as a drag-reducing agent. The amount of the suspension stabilizer added may range from 0% to 40% of the suspending fluid, by weight, but is preferably between 5% and 25%, most preferably between 8% and 12%. A wetting agent, such as a surfactant may be added to aid in the dispersal of the polymer particles to form a uniform mixture. Non-ionic surfactants, such as linear secondary alcohol ethoxylates, linear alcohol ethoxylates, alkylphenol exthoxylates and anionic surfactants such as alkyl benzene sulfonates and alcohol ethoxylate sulfates, e.g., sodium lauryl sulfate, are preferred. The amount of wetting agent added may range from 0.01% to 1% by weight, but is preferably between 0.01% and 0.1%. In order to prevent foaming of the suspending fluid/polymer particle mixture during agitation, a suitable antifoaming agent may be used, typically a silicon oil based commercially available antifoam. Representative but non-exhaustive examples of antifoaming agents are antifoam agents, trademark of, and sold by, Dow Coming, Midland, Mich.; and Bubble Breaker products, trademark of, and sold by, Witco Chemical Company, Organics Division. Generally, no more than 1% of the suspending fluid by weight of the active antifoaming agent is used. Mix tank 150 may be blanketed with a non-oxidizing gas such as nitrogen, argon, neon, carbon dioxide, and carbon monoxide, or other similar gases, or the nonoxidizing gas may be sparged into mix tank 150 during polymer particle addition to reduce the hazard of fire or explosion resulting from the interaction between the small polymer particles.

After the suspending fluid/polymer particle mixture is agitated to form a uniform mixture, a thickening agent may be added to increase the viscosity of the mixture. The increase in viscosity retards separation of the suspension. Typical thickening agents are high molecular weight, water-soluble polymers, including polysaccharides, xanthum gum, carboxymethyl cellulose, hydroxypropyl guar, and hydroxyethyl cellulose. Where water is the suspending fluid, the pH of the suspending fluid should be basic, preferably above 9 to inhibit the growth of microorganisms.

The product resulting from the agitation in the mix tank is a stable suspension of a drag-reducing polymer in a carrier fluid suitable for use as a drag-reducing agent. This suspension may then be pumped or otherwise transported to storage for later use, or used immediately.

In an alternative embodiment the copolymers of the present invention may, instead of suspending them in a suspending fluid, be dissolved in a small amount of a heavy hydrocarbon. Desirable heavy hydrocarbons are often those transported through conduits, and include crude oil, benzene, toluene, ethylbenzene, o-xylene, m-xylene, p-xylene, gasoline, diesel oil, jet fuel, low polynuclear aromatic mixtures and purified hydrocarbon distillates. Gentle mixing should be used to avoid shear, which will result in a performance drop. The present invention is illustrated by the following examples.

EXAMPLE 1

A catalyst was prepared by combining, in an inert environment under ambient temperature and pressure, 2.78 grams of TiCl3.AA with 24.07 grams of purified petroleum distillate, together with 2.03 grams of dibutyl ether promoter according to the teachings of Mack U.S. Pat. No. 4,416,714. The solution was held for 30 minutes while stirring. The catalyst was then activated using 19.80 grams of an aluminum cocatalyst, a 25% solution of diisobutyl aluminum chloride (DIBAC) in heptane solvent ("25% DIBAC solution"). Again, the mixture was held for 30 minutes while stirring.

EXAMPLE 2

A styrene-octene copolymer was prepared in an inert environment under standard temperature and pressure by mixing 47.1 grams of styrene with 453.0 grams of octene in a beaker. After stirring, 4.0 milliliters of a 25% DIBAC solution was added to the beaker. The mixture was held for 30 minutes without stirring. A 3.0 milliliter portion of the catalyst mixture prepared in Example 1 was added to the beaker while stirring continuously. The entire mixture was allowed to react. The subsequent copolymer was subsequently tested and found to have a 95.3% conversion to polymer with an inherent viscosity of 28.1 deciliters/gram.

EXAMPLE 3 t-Butylstyrene-hexene-dodecene Copolymer

A catalyst was prepared in accordance with Example 1. The t-butylstyrene-hexene-dodecene terpolymer was produced in an inert environment under standard temperature and pressure by combining 134.0 grams of t-Butylstyrene, 56.0 grams of hexene, and 311.3 grams of dodecene in a beaker. After stirring, 4.0 milliliters of a 25% DIBAC solution was added to the beaker and the mixture held without stirring for 30 minutes. A 3.0 milliliter portion of the catalyst prepared in accordance with Example 1 was added to the beaker while stirring continuously. The entire mixture was allowed to react. The subsequent polymer was tested and found to have a 91.6% conversion.

The amounts of monomers, catalysts, promoters, initiators, nitrogen, suspending fluid, wetting agent, antifoaming agent, and thickener should be combined in effective amounts to accomplish the results desired and to avoid hazardous operating conditions. These amounts will vary depending on individual process conditions and can be determined by one of ordinary skill in the art. Also, where temperatures and pressures are indicated, those given are a guide to the most reasonable and best conditions presently known for those processes, but temperatures and pressures outside of those ranges can be used within the scope of this invention. The range of values expressed as between two values are intended to include the value state in the range.

What is claimed is:

1. An ultra-high molecular weight copolymer useful as a drag reducer for hydrocarbons comprising:
   a) a vinyl aromatic monomer, wherein the vinyl aromatic monomer comprises one or more monomers selected from the group consisting of styrene, an alkyl-styrene with an alkyl group having between 1 and 10 carbon atoms, a vinylnaphthalene, and a vinyl alkylnaphthalene with an alkyl group having between 1 and 10 carbon atoms and;
   b) a first α-olefin monomer having a carbon chain length of between 2 and 20 carbon atoms;
      wherein the ultra-high molecular weight copolymer has a molecular weight of greater than 5 million.

2. The ultra-high molecular weight copolymer of claim 1 wherein the ultra-high molecular weight copolymer comprising between 1% and 50% vinyl aromatic monomer by weight of the ultra-high molecular weight copolymer.

3. The ultra-high molecular weight copolymer of claim 2 wherein the ultra-high molecular weight copolymer is comprised of between 2% and 25% vinyl aromatic monomer by weight of the ultra-high molecular weight copolymer.

4. The ultra-high molecular weight copolymer of claim 1 further comprising:
   at least one second α-olefin monomer, wherein the second α-olefin monomer is different from the first α-olefin monomer and has a carbon chain length of between 2 and 20 carbon atoms.

5. A method of manufacturing an ultra-high molecular weight copolymer useful as a drag reducer comprising:
   (a) bulk-polymerizing a mixture of a first α-olefin monomer having a carbon chain length of between 2 and 20 carbon atoms and a vinyl aromatic monomer in the absence of a solvent; and
   (b) forming the ultra-high molecular weight copolymer, wherein the ultra-high molecular weight copolymer has a molecular weight of greater than 1 million.

6. The method of claim 5, wherein the vinyl aromatic monomer comprises one or more monomers selected from the group consisting of styrene, an alkyl-styrene with an alkyl group having between 1 and 10 carbon atoms, a vinyl naphthalene, and a vinyl alkylnaphthalene with an alkyl group having between 1 and 10 carbon atoms.

7. The method of claim 5 further comprising prior to step (a): preparing a mixture of between 1% and 50% of the vinyl aromatic monomer and between 99% and 50% of the first α-olefin monomer by weight of the mixture.

8. The method of claim 7, wherein the mixture comprises between 2% and 25% of the vinyl aromatic monomer and between 98% and 75% of the first α-olefin monomer by weight of the mixture.

9. The method of claim 7, wherein the mixture further comprises at least one second α-olefin monomer, wherein the second α-olefin monomer is different from the first α-olefin and has a carbon chain length of between 2 and 20 carbon atoms.

10. A method of manufacturing an ultra-high molecular weight copolymer useful as a drag reducer comprising:
    (a) mixing a first α-olefin monomer having a carbon chain length of between 2 and 20 carbon atoms with a vinyl aromatic monomer, wherein the vinyl aromatic monomer comprises one or more monomers selected from the group consisting of styrene, an alkyl-styrene with an alkyl group having between 1 and 10 carbon atoms, a vinylnaphthalene, and a vinyl alkylnaphthalene with an alkyl group having between 1 and 10 carbon atoms, to form a monomer mixture;
    (b) adding an initiator;
    (c) adding a catalyst;
    (d) adding a promoter; and
    (e) reacting the monomer mixture to form the ultra-high molecular weight copolymer, wherein the ultra-high molecular weight copolymer has a molecular weight of greater than 1 million.

11. The method of claim 10, wherein the vinyl aromatic monomer comprises one or more monomers selected from the group consisting of styrene, an alkyl-styrene with an alkyl group having between 1 and 10 carbon atoms, a vinyl naphthalene, and a vinyl alkylnaphthalene with an alkyl group having between 1 and 10 carbon atoms.

12. The method of claim 10, wherein the monomer mixture comprises between 1% and 50% of the vinyl aromatic monomer and between 99% and 50% of the first α-olefin monomer by weight of the mixture.

13. The method of claim 12, wherein the monomer mixture comprises between 2% and 25% of the vinyl aromatic monomer and 98% and 75% of the first α-olefin monomer by weight of the mixture.

14. The method of claim 10 further comprising after or simultaneously with step (a) but before step (b):
    adding at least one second α-olefin monomer being different from the first α-olefin and having a carbon chain length of between 2 and 20 carbon atoms to the monomer mixture.

15. The method of claim 10, wherein the promoter is dibutyl ether.

16. The method of claim 10, wherein the initiator is disobutyl aluminum chloride.

17. The method of claim 10, wherein the catalyst comprises a Ziegler-Natta catalyst.

18. A method for the preparation of a drag-reducing copolymer suspension comprising:
    a) preparing an ultra-high molecular weight copolymer by co-polymerization of at least one α-olefin monomer, with at least one vinyl aromatic monomer, wherein the α-olefin monomer has a carbon chain length of between 2 and 20 carbon atoms;
    b) grinding the ultra-high molecular weight copolymer at a temperature below the glass-transition temperature of the ultra-high molecular weight copolymer to form ground polymer particles; and
    c) mixing the ground polymer particles with a suspending fluid to form the drag-reducing polymer suspension.

19. The method of claim 18, wherein the step of preparing the ultra-high molecular weight copolymer further comprises prior to or simultaneous with polymerizing the α-olefin monomer with the vinyl aromatic monomer:
    mixing the α-olefin monomer and the vinyl aromatic monomer with an initiator or mixing the α-olefin monomer and the vinyl aromatic monomer with a promoter or both; and
    mixing the α-olefin monomer and the vinyl aromatic monomer with a catalyst.

20. The method of claim 18, wherein the ultra-high molecular weight copolymer has between 2 and 25% of the vinyl aromatic monomer and 98% and 75% of the α-olefin monomer, by weight of the ultra-high molecular weight polymer.

21. The method of claim 18, wherein the vinyl aromatic comprises one or more monomers selected from the group consisting of styrene, an alkyl-styrene with an alkyl group having between 1 and 10 carbon atoms, a vinyl naphthalene, and a vinyl alkylnaphthalene with an alkyl group having between 1 and 10 carbon atoms.

22. The method of claim 18, wherein the copolymerization is selected from bulk polymerization or solution polymerization.

23. The method as described in claim 18, wherein the grinding of the ultra-high molecular weight copolymer is at a temperature below −130° C.

24. The method of claim 18, wherein the ultra-high molecular weight copolymer has a molecular weight in excess of 5 million.

25. The method of claim 18, wherein the suspending fluid further comprises one or more components selected from the group consisting of a wetting agent, an antifoaming agent, and a thickening agent.

26. The method of claim 18, further comprising a partitioning agent.

27. A drag-reducing polymer solution comprising:
a) an ultra-high molecular weight copolymer having at least one vinyl aromatic monomer, wherein the vinyl aromatic monomer comprises one or more monomers selected from the group consisting of styrene, an alkyl-styrene with an alkyl group having between 1 and 10 carbon atoms, a vinylnaphthalene, and a vinyl alkyl-naphthalene with an alkyl group having between 1 and 10 carbon atoms, and at least one α-olefin monomer having a carbon chain lengths of between 2 and 20 carbon atoms; and
b) a heavy hydrocarbon.

28. The drag-reducing polymer solution of claim 27, wherein the ultra-high molecular weight copolymer has between 2 and 25% of the vinyl aromatic monomer and 98% and 75% of the first α-olefin monomer, by weight of the ultra-high molecular weight polymer.

29. The drag-reducing polymer solution of claim 27, wherein the heavy hydrocarbon comprises one or more hydrocarbons selected from the group consisting of crude oil, benzene, toluene, ethylbenzene, o-xylene, m-xylene, p-xylene, gasoline, diesel oil, jet fuel, low polynuclear aromatic mixtures and a purified petroleum distillate.

30. The drag-reducing polymer solution of claim 27, wherein the ultra-high molecular weight copolymer has a molecular weight in excess of 5 million.

* * * * *